(12) United States Patent
Krishnamoorthy et al.

(10) Patent No.: US 7,503,343 B2
(45) Date of Patent: **\*Mar. 17, 2009**

(54) SIPHONABLE CHECK VALVE AND METHOD OF MAKING SAME

(75) Inventors: Pk Haridass Krishnamoorthy, Belleville, MI (US); Steven H. Verzyl, Ypsilanti, MI (US); Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 335 days.

This patent is subject to a terminal disclaimer.

(21) Appl. No.: 11/235,305

(22) Filed: Sep. 26, 2005

(65) Prior Publication Data

US 2006/0037648 A1 Feb. 23, 2006

Related U.S. Application Data

(63) Continuation-in-part of application No. 10/135,693, filed on Apr. 30, 2002, now Pat. No. 6,959,727.

(51) Int. Cl.
*F16K 15/02* (2006.01)
*B65B 1/04* (2006.01)

(52) U.S. Cl. ........................ 137/588; 137/151; 137/538; 137/592; 251/356; 141/301

(58) Field of Classification Search .................. 137/151, 137/538, 587, 588, 592; 251/356; 141/301
See application file for complete search history.

(56) References Cited

U.S. PATENT DOCUMENTS

| 6,056,029 | A | * | 5/2000 | Devall et al. ................. 137/588 |
| 6,234,195 | B1 | * | 5/2001 | Kippe et al. ................. 137/588 |
| 6,648,016 | B2 | | 11/2003 | Farrenkopf |
| 6,959,727 | B2 | * | 11/2005 | Krishnamoorthy et al. .. 137/588 |
| 2003/0116202 | A1 | | 6/2003 | Krishnamoorthy |
| 2003/0136448 | A1 | | 7/2003 | Farrenkopf |

FOREIGN PATENT DOCUMENTS

EP  1 359 043 A2  11/2003
EP  1 479 554 A1  11/2004

OTHER PUBLICATIONS

EP Search Report, EP 0601999302 search completed Jan. 26, 2007.
PCT Search Report, PCT/IB2006/002710 search completed Feb. 2, 2007.

\* cited by examiner

*Primary Examiner*—John Rivell
(74) *Attorney, Agent, or Firm*—Anna M. Shih

(57) ABSTRACT

A check valve for connection in a fuel tank filler tube. The valve has a tubular body with a plurality of radially inwardly extending projections on the inner surface of the tubular body or mounting adaptor. A valve seat is disposed downstream of the ribs, and an aperture is formed in the side of the tubular body. When the end of a siphoning hose is inserted into the check valve, the projections deflect the hose through the aperture to facilitate further insertion of the hose into the tank.

10 Claims, 5 Drawing Sheets

SIPHONABLE CHECK VALVE AND METHOD OF MAKING SAME

This is a continuation-in-part of application U.S. Ser. No. 10/135,693 filed on Apr. 30, 2002, which is now U.S. Pat. No. 6,959,727.

BACKGROUND OF THE INVENTION

The present invention relates to filler tubes for motor vehicle fuel tanks and the problems related to controlling emission of fuel vapors therefrom during refueling operations.

Currently, it is required to provide for controlling the emission to the atmosphere of fuel vapor during refueling when a nozzle has been inserted into the fuel tank filler tube for discharging fuel into the filler tube. Currently, vehicle fuel tank filler tubes are designed to have a baffle in the filler tube with a flapper valve having aperture sized to closely interfit the fuel discharge nozzle and thereby minimize the opening available for fuel vapor emission during refueling.

However, it is now required to provide for withdrawal of fuel from the tank through the filler tube in the event that in service removal of the tank is required after the initial assembly of the vehicle. The withdrawal of fuel from the vehicle tank is usually accomplished by insertion of a siphoning hose through the filler tube into the tank. However, where a check valve has been employed in the filler tube downstream of the flapper valve to prevent overfill or liquid escape during vehicle rollover it has been found quite difficult to push the end of the siphon hose through the check valve to the bottom of the fuel tank once the hose has entered the tank. It has been experienced that the end of the siphon hose lodges in the check valve.

It has thus been desired to provide a way of incorporating a check valve in a fuel tank filler tube such that it is easy to push a siphoning hose into the filler tube and through the check valve for withdrawal of fuel from the tank in the event that it is necessary to remove the tank from the vehicle for service. It has further been desired to provide such a siphonable filler tube check valve arrangement which is sufficiently low in manufacturing costs to be competitive in high volume automotive production and which is easy to assemble and install into the tank filler during manufacture of the tank and assembly into the vehicle.

BRIEF SUMMARY OF THE INVENTION

The present invention provides a filler tube assembly for attachment to a vehicle fuel tank which employs a tubular body having an annular valve seat therein with a valve that is biased toward the closed position against the seating surface. The tubular body has projections provided on the inlet end of the body upstream of the valve seating surface for diverting a siphoning hose through an aperture formed in the side of the filler tube body downstream of the valve seating surface. The valve includes a resilient seal that provides for sealing against the valve seating surface with a minimum of biasing force, and thus minimum resistance to opening is encountered upon refueling nozzle fluid flow or siphoning hose insertion.

DETAILED DESCRIPTION OF THE INVENTION

Figure 2:
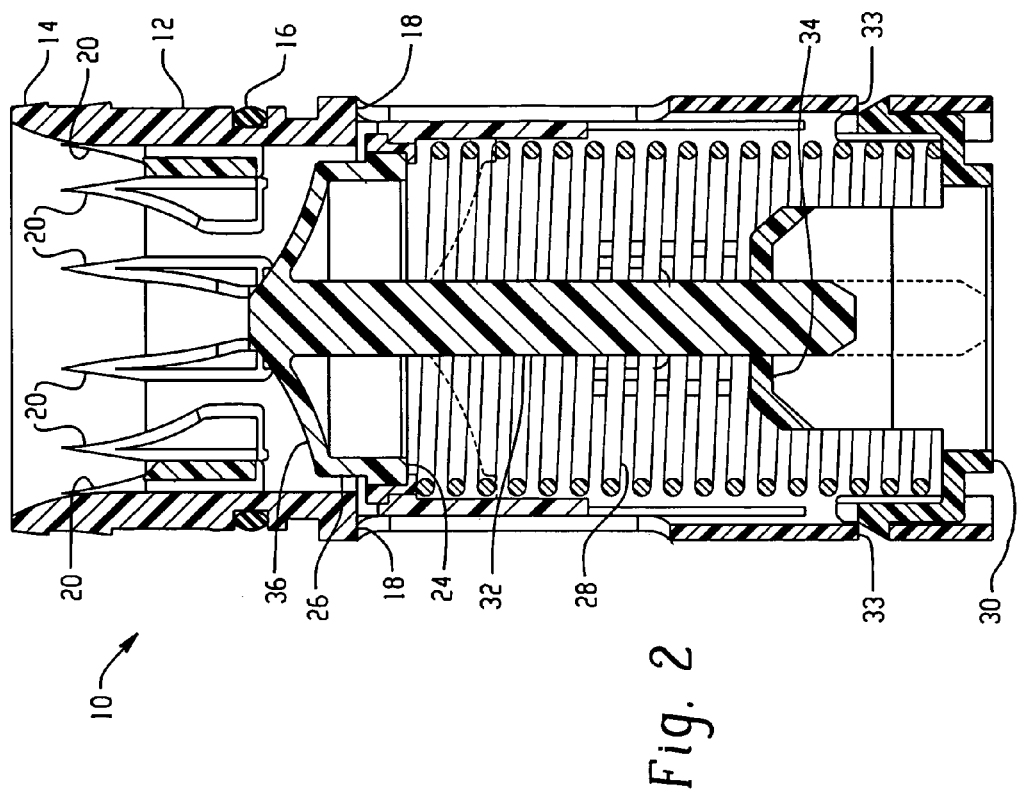
FIG. 2 is a cross-section taken along section indicating lines 2-2 of FIG. 1.
Figure 1:
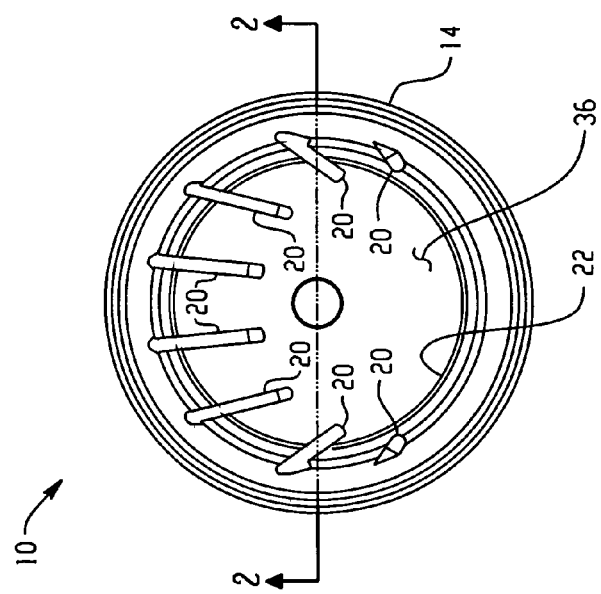
FIG. 1 is a top view of a valve of one embodiment of the present invention therein.

Referring to FIGS. 1 and 2, the valve assembly of one embodiment of the present invention is indicated generally at 10 and includes a tubular housing or body 12. The upper end of the body 12 has annular barbs 14 provided on the outer surface thereof for connection to the lower end of the tank filler tube (not shown). A sealing ring 16 is provided below the barbs 14 to provide a positive seal between the upper end of the body 12 and the filler tube.

The inner periphery of the body 12 adjacent the upper end has a plurality of circumferentially spaced radially inwardly extending projections, such as ribs 20, that are preferably, by not necessarily formed integrally therewith, with each of the ribs having the inward edge thereof tapered in an axial direction as shown in FIG. 2. The radially inward edges of the ribs 20 define, in cooperation with portions 22 of the opposite side of the inner periphery of the body 12, a reduced cross-section opening which is offset from the center of the body. This offset opening is operative to receive therein the end of a siphoning hose (not shown) when the hose is inserted through the unshown filler tube and upper open end of the body 12. The specific locations of the ribs 20 are not important as long as they are able to guide the hose through the offset opening. Upon insertion of the siphoning hose, the tapered edges of the ribs 20 serve to deflect or cam the end of the siphoning hose into the offset opening.

An annular valve seating surface 24 is formed about the inner periphery of the body 14 at a location below, i.e. downstream of the ribs 20. The tubular body 12 has at least one and preferably a plurality of circumferentially spaced apertures 18 formed in the side walls of the body downstream of the annular valve seating surface 24, which apertures 18 are of sufficient size to provide adequate clearance for the siphoning hose to extend outwardly therethrough. A moveable poppet 26 is disposed for sealing against the valve seating surface 24; and, the poppet is biased in an upward direction by a spring 28 having its upper end registered against the undersurface of the poppet. The lower end of spring 28 is retained by a suitable retainer 30 disposed in the lower end of the housing or body 12 and retained therein by barbs 31 engaging corresponding slots 33 appropriately located in the body.

Poppet 26 has a pilot 32 formed thereon which extends downwardly within the spring and through an aperture 34 provided in the retainer 30 for guiding movement of the poppet. The upper end of the poppet 26 has a tapered surface 36 which serves to deflect the end of a siphoning hose (not shown) outwardly or laterally upon insertion of the end of the hose into contact with tapered surface 26 and effecting downward movement of the poppet to the position shown in dashed outline in FIG. 2.

Figure 3:
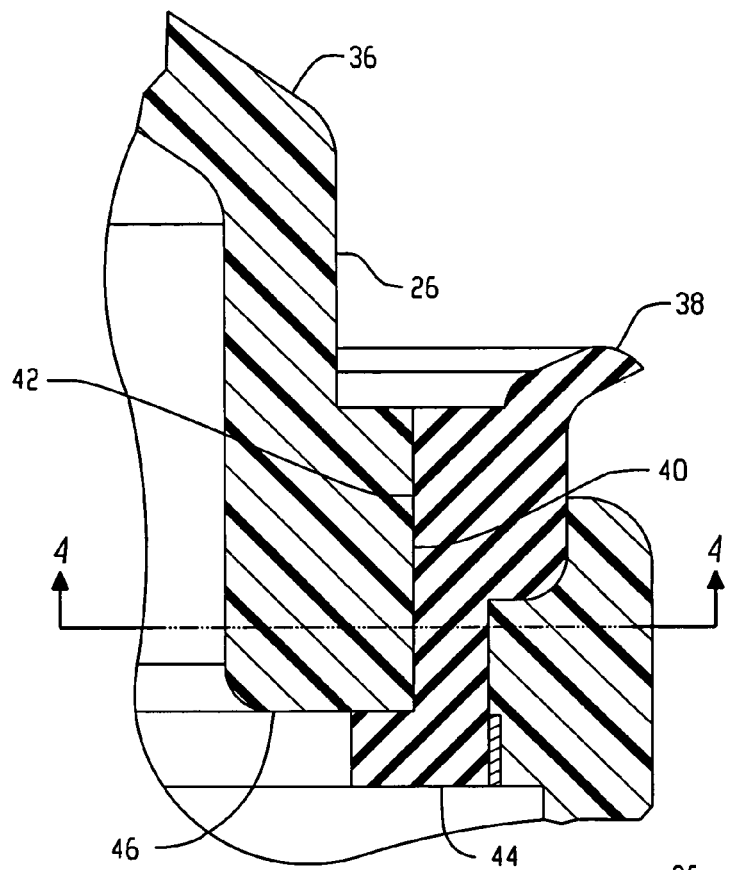
FIG. 3 is an enlarged view of a portion of FIG. 2.
Figure 4:
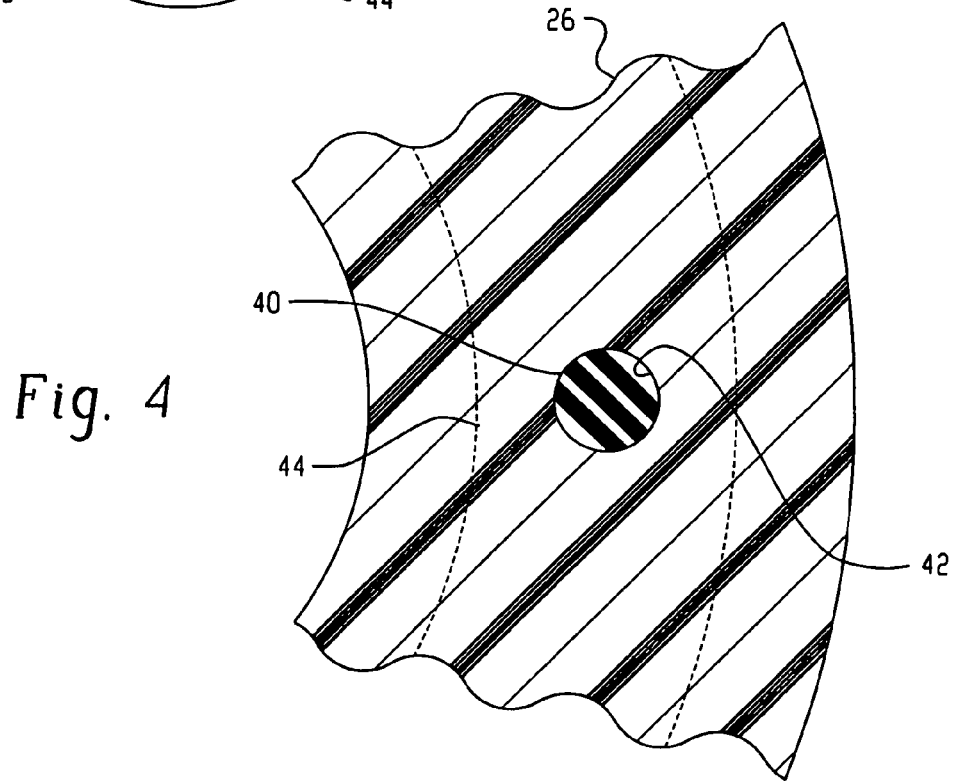
FIG. 4 is a section view taken along section indicating lines 4-4 of FIG. 3; and, FIG. 5 is an exploded view of the valve of FIG. 1.
Figure 5:
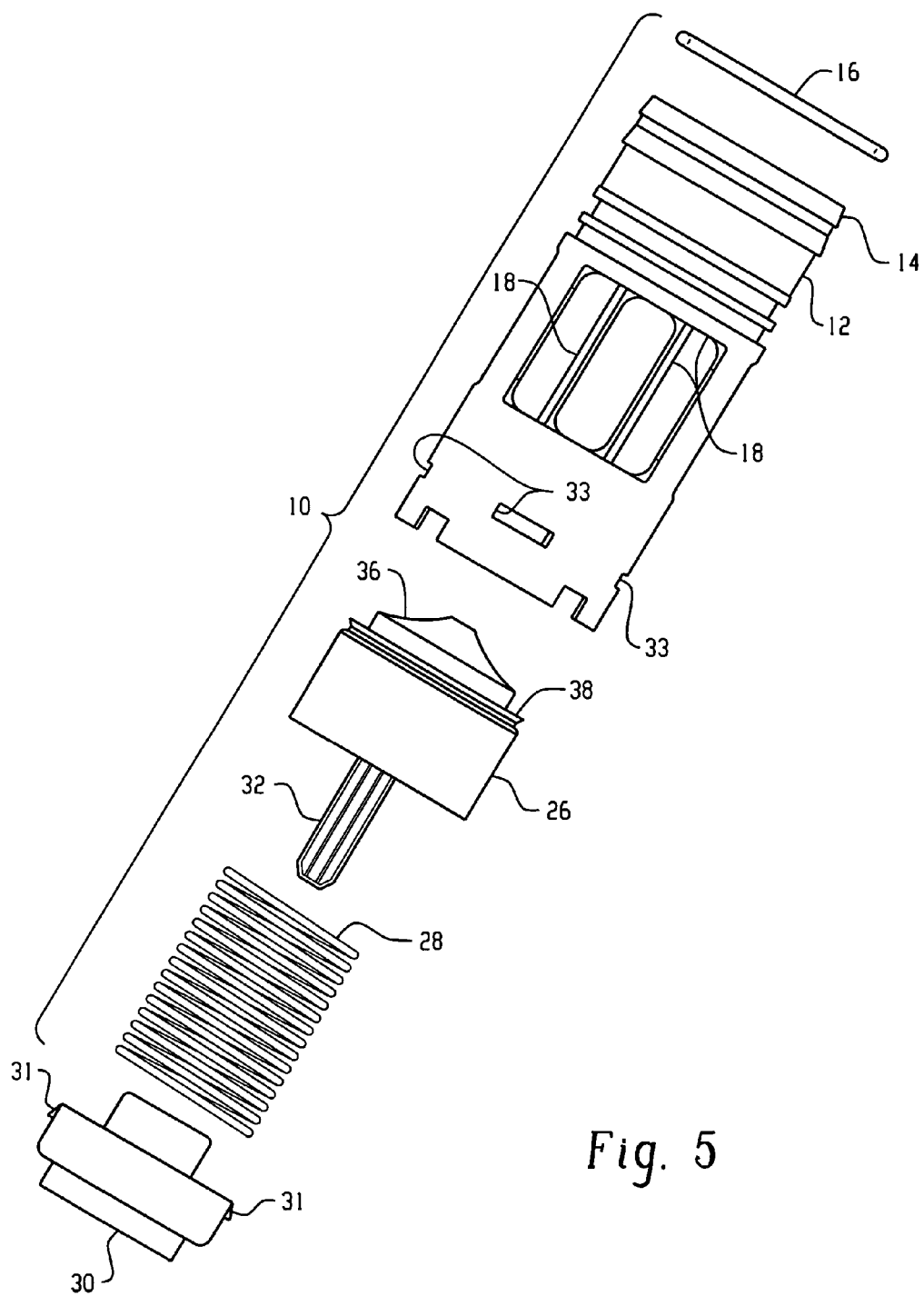

Referring to FIGS. 3 and 4, the poppet 26 has an annular resilient seal 38 formed thereon preferably by molding over the poppet. Seal 38 has integral portions thereof denoted by reference numeral 40 in FIGS. 3 and 4 extending through a plurality of circumferentially spaced aperture 42 formed in an annular shoulder in the poppet. Seal 38 has an annular flange 44 formed integrally with portions 40 and extending about the undersurface 46 of the shoulder for retaining the seal 38 on the poppet. In the presently preferred practice, the seal 38, portions 40 and flange 44 are formed integrally on the poppet by placing the poppet in a mold (not shown) and overmolding with a suitable elastomeric material.

The body 12, poppet 26 and retainer 30 may be formed of any suitable engineered resinous material which has electrostatic dissipative properties. In the present practice of the invention polythalamide (PTA) material fractionally filled with particulate glass and carbon has been found to be satisfactory; however, other resinous materials and particulate fill may be employed.

Figure 6:
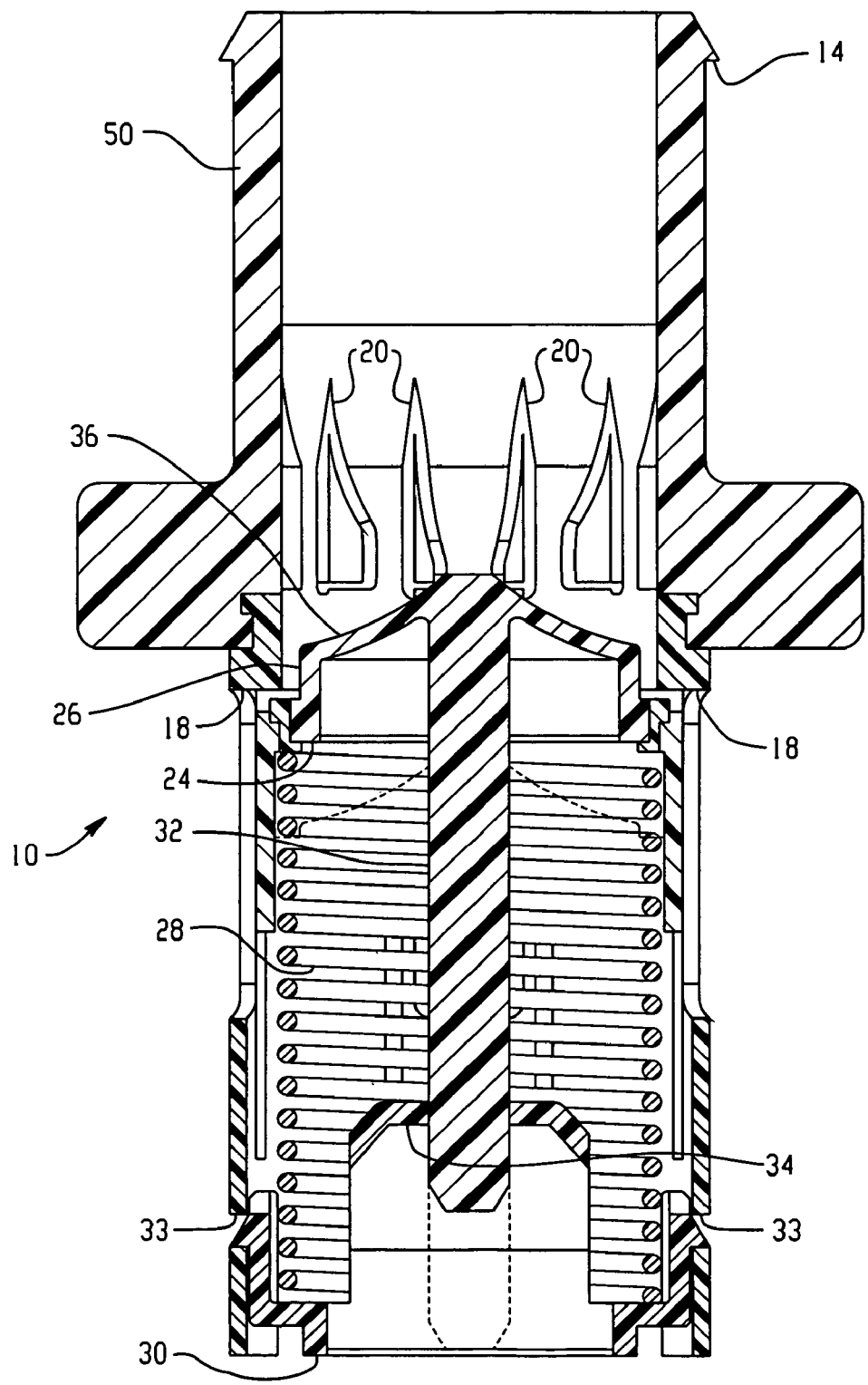
FIG. 6 is a section view of a valve assembly according to a further embodiment of the invention.
Figure 7:
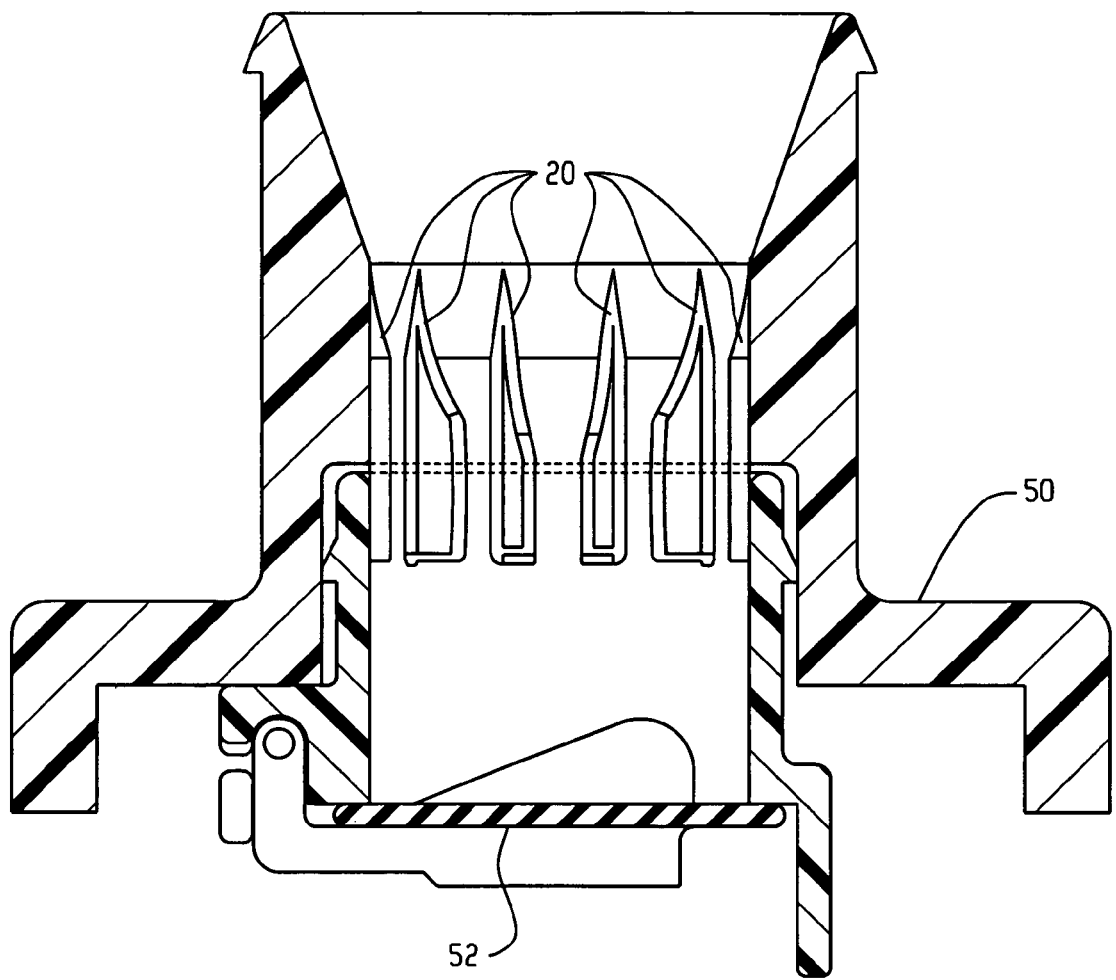
FIG. 7 is a section view of a valve assembly according to yet another embodiment of the invention.

Note that the ribs 20 can be incorporated in a mounting adapter 50 of the valve body. FIG. 6 shows one structure where the ribs 20 are formed in the mounting adaptor 50 rather than the poppet valve itself. Also, the specific configuration of the valve itself does not affect the invention; the ribs 20 can be coupled with any valve, not just a poppet valve, without departing from the scope of the invention. For example, ribs can be coupled with any valve assembly where guiding the hose is desirable, such as a flapper valve or other valve structure. FIG. 7 shows an embodiment where the ribs 20 are disposed near a flap-type valve 52 rather than a poppet valve.

The present invention thus provides a valve that employs deflector projections in a passage of a valve; and, upon opening of the valve by the insertion of a siphoning hose, the end of the hose is deflected outwardly through apertures formed in the side wall of the valve body.

Although the invention has hereinabove been described with respect to the illustrated embodiments, it will be understood that the invention is capable of modification and variation and is limited only by the following claims.

What is claimed is:

1. A check valve assembly for use in a fuel tank filler tube comprising:
   a valve body having a valving passage with an inlet;
   a plurality of spaced projections extending from an inner surface of the valving passage adjacent the inlet;
   an annular valve seat disposed in said passage in proximity to the projections;
   a valve that is operable for seating against the annular valve seat;
   an aperture formed in the wall of said passage and located in a portion of said body to be disposed within the tank; and
   a resilient member that biases the valve member in a direction closing the valve on the valve seat,
   wherein upon insertion of one end of a siphon hose in the inlet, the plurality of projections direct the one end through the aperture to facilitate further insertion of the siphon hose into the tank.

2. The assembly defined in claim 1, wherein the plurality of projections are configured to direct the one end of the siphon hose to one side of the passage.

3. The assembly defined in claim 1, wherein the resilient member comprises a spring.

4. The assembly defined in claim 1, wherein said valve includes an annular resilient seal formed of elastomeric material.

5. A check valve assembly for use in a fuel tank filler tube comprising:
   a valve body having a valving passage with an inlet;
   a mounting adapter connected to the valve body;
   a plurality of spaced projections extending from an inner surface of the mounting adaptor near the inlet;
   an annular valve seat disposed near the projections;
   a valve that is operable for seating against the annular valve seat;
   an aperture formed in the wall of said passage and located in a portion of said body to be disposed within the tank; and,
   a resilient member that biases the valve member in a direction closing the valve on the valve seat,
   wherein upon insertion of one end of a siphon hose in the inlet, the plurality of projections direct the one end Through the aperture to facilitate further insertion of the siphon hose into the tank.

6. The assembly defined in claim 5, wherein the plurality of projections are configured to direct the one end of the siphon hose to one side of the passage.

7. The assembly defined in claim 5, wherein the resilient member comprises a spring.

8. The assembly defined in claim 5, wherein said valve includes an annular resilient seal formed of elastomeric material.

9. A method of making a check valve for use in a fuel tank filler tube comprising:
   providing a valve body having a flow passage with an inlet and outlet end;
   attaching a mounting adaptor to the valve body;
   forming a plurality of projections on an inner surface of the passage in the mounting adaptor near the inlet end of the valve body;
   forming an annular valve seat in the passage near the projections;
   forming a siphon hose aperture in one side of the passage, wherein the plurality of projections act as a siphon hose guide toward the aperture; and
   disposing a valve in the passage for guided movement therein and biasing the valve in a direction to close the annular seat on the valve seat.

10. The method defined in claim 9, wherein said step of forming a plurality of projections includes forming a plurality of radially inwardly extending projections and locating the projections around one half of the circumference of the inner surface of the passage.

* * * * *